United States Patent [19]

Howell et al.

[11] Patent Number: 5,694,490
[45] Date of Patent: Dec. 2, 1997

[54] SYSTEM AND METHOD FOR A SIMULTANEOUS MULTI-BAND BLOCK-STOP FILTER

[75] Inventors: Stephen K. Howell, Santa Clara; Liang He, Sunnyvale, both of Calif.

[73] Assignee: Sun Microsystems, Inc., Mountain View, Calif.

[21] Appl. No.: 563,066

[22] Filed: Nov. 27, 1995

[51] Int. Cl.$^6$ ............................................. G06K 9/00
[52] U.S. Cl. ............................................. 382/260; 382/128
[58] Field of Search ............................................. 382/128, 131, 382/132, 212, 273, 260, 275, 304; 358/453, 517; 378/62; 364/413.13, 413.14

[56] References Cited

U.S. PATENT DOCUMENTS

| | | | |
|---|---|---|---|
| 5,270,963 | 12/1993 | Allen et al. | 364/861 |
| 5,283,736 | 2/1994 | Nagatsuka et al. | 364/413.13 |
| 5,341,442 | 8/1994 | Garrett | 382/166 |
| 5,436,672 | 7/1995 | Medioni et al. | 348/591 |
| 5,617,313 | 4/1997 | Namiki | 395/263 |

*Primary Examiner*—Yon J. Couso
*Attorney, Agent, or Firm*—Skjerven, Morrill, MacPherson, Franklin & Friel; Forrest E. Gunnison

[57] ABSTRACT

A system and method for a simultaneous multi-band block-stop filter is disclosed. The block-stop filter provides rapid filtering of an input data stream by simultaneously comparing a plurality of data band components to the low threshold, associated with the band of which the particular data band component is a member, and then simultaneously comparing the plurality of data band components to an associated high threshold. The block-stop filter can also improve performance by parallelizing the act of storing the filtered data band components into the output data stream.

27 Claims, 8 Drawing Sheets

SYSTEM AND METHOD FOR A SIMULTANEOUS MULTI-BAND BLOCK-STOP FILTER

CROSS-REFERENCE TO RELATED APPLICATIONS

This application relates to the co-pending application Ser. No. 08/236572, filed Apr. 29, 1994, now pending, entitled "A CENTRAL PROCESSING UNIT WITH INTEGRATED GRAPHICS FUNCTION", by Van Hook et al., owned by the assignee of this application and incorporated herein by reference.

BACKGROUND OF THE INVENTION

1. Field of the Invention

This invention relates generally to selectively filtering audio or image data and in particular to block-stop filtering of audio and image data.

2. Description of Related Art

In many different applications, data generated by a transducer includes information that is unwanted. The information can be, for example, from background effects or information associated with features or materials of an object that are not of interest. For example, in magnetic resonance imaging (MRI), data corresponding to light intensities are generated. The MRI light intensity data includes contributions from both bone tissue and muscle tissue. If only the bone tissue is of interest, the contribution to the MRI light intensity data from the muscle tissue is unwanted.

A common way to filter information to remove unwanted contributions is a block-stop filter. A block-stop filter, as its name implies, removes a particular block of information from the data, or alternatively replaces a block of information with another block of information.

For example, consider an input data stream $I(x)$ having X data points and individual signals $I_x$. The block-stop filter receives input data stream $I(x)$ and generates an output data stream $O(x)$, also having X data points. Thus, the block-stop filter takes a first set of signals and generates a second set of signals.

The process used to convert the first set of signals to a second set of signals makes use of information concerning the first set of signals $I(x)$. Typically, signals within a certain range, i.e., a block, are altered. The signal levels that define the block are defined by a low threshold signal TLOW, and a high threshold signal THIGH.

Thus, when the set of signals $I(x)$ are passed through the block-stop filter, signals within the range of associated low threshold signal TLOW and an associated high threshold signal THIGH are replaced with an associated predetermined signal level MAP. Signals outside the range of associated low threshold signal TLOW and associated high threshold signal THIGH are passed through the block-stop filter unaltered. Thus, the operation of the block-stop filter for a set of input signals $I(x)$ is:

$O_x = I_x$, if $I_x <$ TLOW $O_x =$ MAP, if TLOW $\leq I_x \leq$ THIGH; and $O_x = I_x$, if $I_x >$ THIGH where $I_x$ is a particular input signal;

$O_x$ is the block-stop filter output signal in response to input signal $I_x$; and MAP is the associated predetermined signal level.

Using the same MRI example, an MRI scan is a gray scale image with each pixel representing a light intensity. Bone tissue and muscle tissue appear at different ranges of intensity. In analyzing the MRI scan for bone tissue damage, it is beneficial to eliminate the contribution of the muscle tissue from the image. By passing the pixel data through a block-stop filter, the contribution of the muscle tissue is negated.

The block-stop filter determines whether a particular pixel has an intensity lower than the lowest intensity associated with muscle tissue or higher than the highest intensity associated with muscle tissue. In other words, if the intensity of the pixel is not within the range associated with muscle tissue, the pixel is passed to the output data stream unaltered. However, if the intensity of the pixel is within the range associated with muscle tissue, the intensity of the pixel is replaced in the output data stream with an unobtrusive intensity, i.e. signal MAP. Consequently, the output image from the block-stop filter gives an unobstructed view of the bone tissue.

One of the issues in using a block-stop filter is efficient processing of the stored data representing the image or audio signal. The data streams can be stored in a variety of formats. For audio data streams, the data typically are stored sequentially using only one dimension. For image data, the data stream likely is stored in two dimensions. More particularly, the image data are stored by rows in the vertical dimension, with each row having a number of picture elements, called pixels, in the horizontal dimension.

In some cases, the rows of an image are not stored sequentially due to padding of the rows with some extraneous data. Therefore, when processing image data, usually each row is processed as a separate one dimensional stream of image data.

Typically, conventional systems process the image one pixel at a time. The pixels are processed left to right sequentially across a row and each row is processed in sequence from the top of the image to the bottom of the image.

However, a data stream may include data elements which have multiple data band components. For example, pixels in a color image can be represented by three bands, one for red, one for green, and one for blue color intensities. Often color image data will also include an alpha band in addition to the three color bands. The alpha band can be used to provide any form of additional information about the pixel, e.g. a transparency factor, a depth factor, etc. For multi-banded data streams, the data can be stored in band interleaved format or band sequential format.

In band interleaved format, the various band components of a data element are stored together. For example in a twenty-four bit color image, the data stream is three bands of one-byte components, a one-byte red component, a one-byte green component, and a one-byte blue component. The one-byte red, green, and blue components of each pixel are stored in sequence together in the band interleaved format, i.e. red1, green1, blue1, red2, green2, blue2, etc., where redx refers to the one-byte red component of pixel x.

In band sequential format, the components for each of the data element are stored together. For the twenty-four bit color image the data stream is arranged so that the red band of all the data elements are stored together, followed by the green band, and then the blue band, i.e. red1, red2 . . . green1, green2, . . . blue1, blue2 . . .

When a block-stop filter is used for a multi-banded data stream, each data band can have its own associated low threshold signal TLOW, associated high threshold signal THIGH, and associated predetermined signal level MAP that is output for components of the band within the range defined by the two threshold signal levels. In this case, each of the data bands must be processed independently.

If the pixel data stream is stored or provided to the band stop-filter in the band interleave format, the component in each band for a pixel is preferably processed sequentially before processing of the next pixel. If the data stream uses band sequential format, every pixel's first band is processed sequentially before the processing of the next data band.

Figure 1:
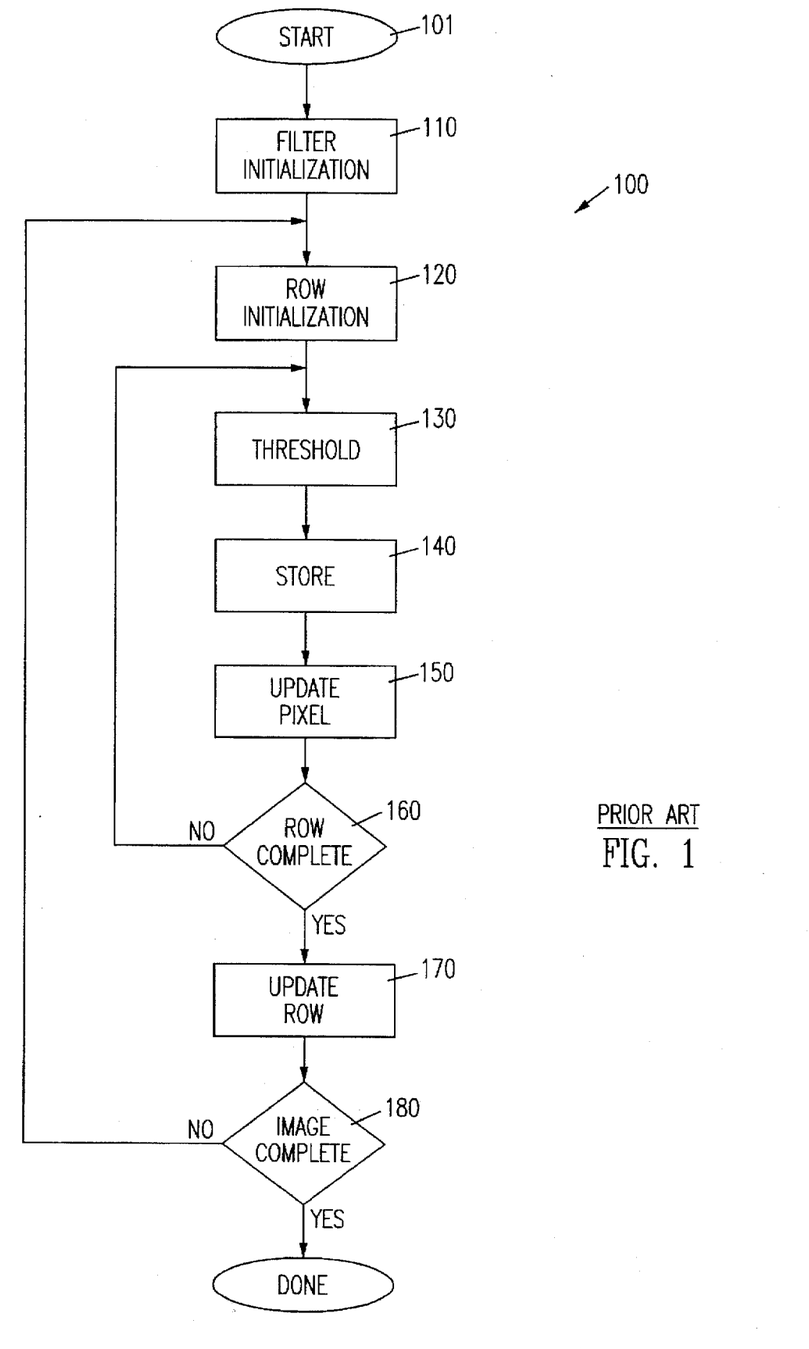
FIG. 1 shows a process flow diagram for block-stop filtering of a multi-band interleaved two-dimensional image data stream.

FIG. 1 shows a process flow diagram for block-stop filtering of a multi-band interleaved two-dimensional image data stream. The multi-band interleaved two-dimensional input data stream is stored in a memory starting at a location with address Input_Stream_Address. The output data stream is also stored in the memory starting at a location starting with address Output_Stream_Address. For some applications, Input_Stream_Address and Output_Stream_Address are the same so that the output data stream replaces the original input data stream.

Hence, in filter initialization operations 110, a row input start point is set to address Input_Stream_Address and a row output start point is set to address Output_Stream_Address. Also a row counter is initialized, i.e, set to zero. Upon completion of filter initialization operations 110, processing transfers to row initialization operation 120.

In row initialization operation 120, a row pixel counter is initialized, e.g., set to zero. An input element pointer Ie is set to the row input start point. Similarly, an output element pointer Oe is set to the row output start point. Row initialization operation 120 transfers to threshold operation 130.

Figure 2:
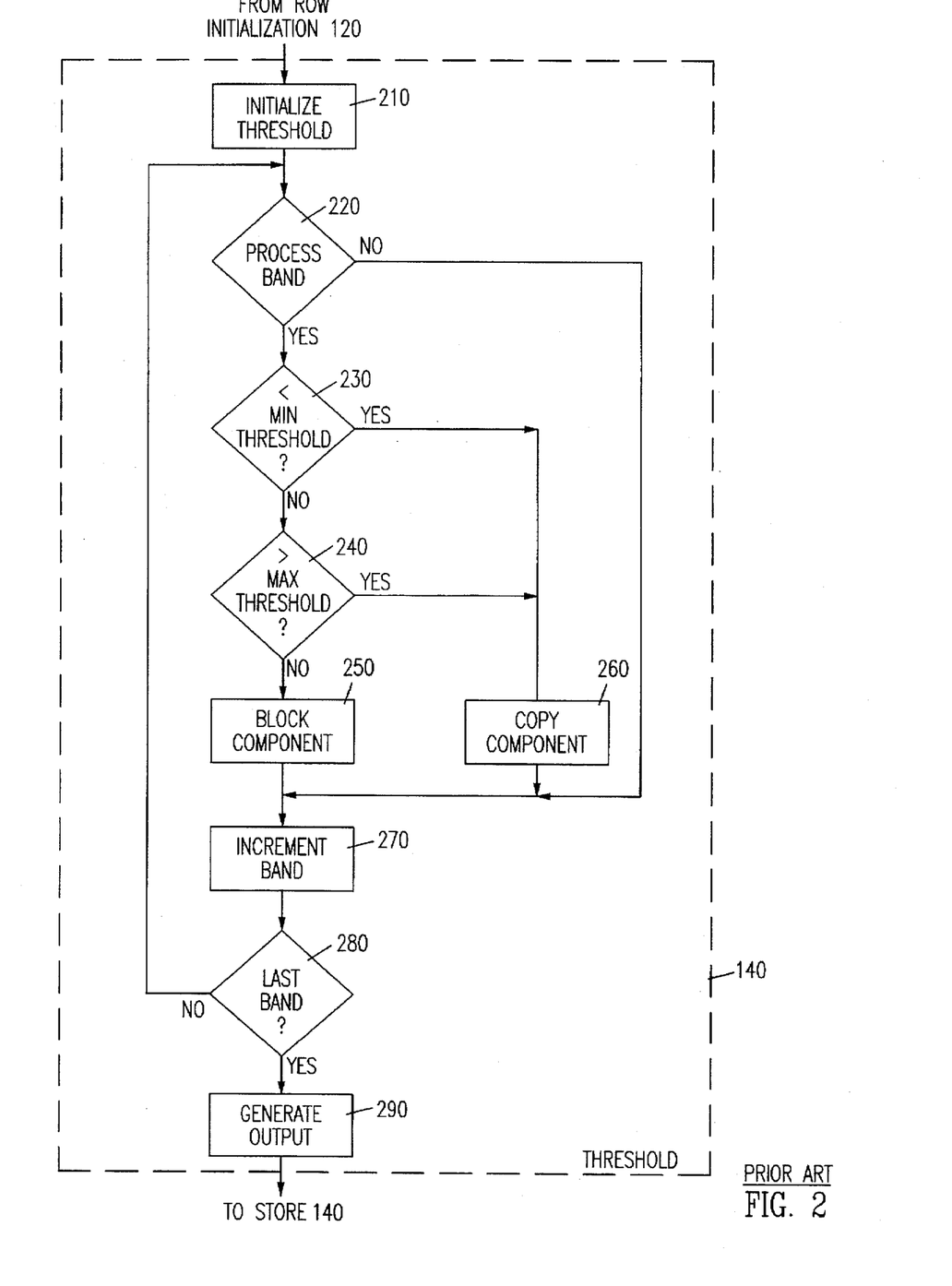
FIG. 2 shows a process flow diagram of a conventional implementation of the threshold operation.

In threshold operation 130, the block-stop filter is used to sequentially generate an output data element OUT, that includes a component for each of the multiple bands. The implementation of threshold operations 130 is shown in FIG. 2 and is described below. After output data element OUT is generated, threshold operation 130 transfers processing to store operation 140.

In store operation 140, the output data element is stored at the location referenced by Oe. Store operation 140 transfers to update pixel operations 150.

In update pixel operations 150, the various pointers and the row pixel counter are updated. Specifically, the row pixel counter is incremented by one. Input element pointer Ie and output element pointer Oe are incremented by pixel storage length pixel_length so that the pointers identify the storage location of the next pixel to be processed, and the storage location of the next output pixel, respectively. For example, for twenty-four bit color, pixel storage length pixel_length is three bytes. Update pixel operations 150 transfers to row complete check operation 160.

Row complete check operation 160 determines if the end of a row has been reached. If the current value of the row pixel counter is greater than or equal to the number of pixels in a row, i.e., greater than or equal to the width of the image, processing of the row is complete. Consequently, if the value of the row pixel counter is less than the width of the image, processing transfers to threshold operation 130.

Threshold operation 130, store operation 140, and update pixel operation 150 are repeated and processing returns to row complete operation 160. If the value of the row pixel counter is less than the width of the image, processing again transfers to threshold operation 130. However, when the value of the row pixel counter is equal to or greater than the width of the image, processing of the current row of the image is complete and processing transfers to update row operations 170.

In update row operations 170, process 100 is updated to process the next row of pixels in the image. In update row operations, the row counter is incremented by one, and the row input start point and the row output start point are updated to point to the address of the location for the next row. Specifically, the row input start point and the row output start point are both incremented by the length of a row. Update row operation transfers to image complete check operation 180.

Image complete check operation 180 determines whether all the rows in the image have been processed. If the value of the row counter is greater than or equal to the number of row in the image, operation 180 transfers to done and otherwise to row initialization operations 120.

If processing transfers to row initialization operations 120, operations 130 to 170 are repeated for the next row of the image in the same manner as described above. When processing transfers to done, the complete image has been filtered and the input image has been converted to an output image with components of the image filtered by process 100.

FIG. 2 is a process flow diagram of threshold operation 130 for the multi-band interleaved two-dimensional image data stream. These operations are performed on known image data. Thus, the length of each pixel in the input image is known. The number of bands and whether each band is processed by process 100 also is known. Associated low threshold signal TLOW_i, associated high threshold signal THIGH_i, and associated predetermined signal level MAP_i for each band i is stored in a memory.

In initialize threshold operations 210, the data starting at the location of input element pointer Ie and extending one pixel storage length pixel_length are copied into a work space for further processing. Also, a data band counter B is initialized, e.g., set to zero. The data band counter is used to determined when a component in each band for the current pixel has been processed. Operations 210 transfers to process band check operation 220.

In process band check operation 220, threshold operation 130 determines whether the component for the band identified by data band counter B should be processed. If component is not processed, operation 220 transfers to increment band operation 270 and otherwise to minimum threshold check operation 230.

In minimum threshold check operation 230, the component for the band identified by data band counter B in the working memory is compared with associated low threshold signal TLOW_i where i is the value of data band counter B. If the component is less than associated low threshold signal TLOW_i, check operation 230 transfers to copy component operation 260 and otherwise to maximum threshold check operation 240.

In maximum threshold check operation 240, the component for the band identified by data band counter B in the working memory is compared with associated high threshold signal THIGH_i where i is the value of data band counter B. If the component is greater than associated high threshold signal THIGH_i, check operation 240 transfers to copy component operation 260 and otherwise to block component operation 250.

Thus, if the component of the current pixel identified by band counter B is within the range defined by the associated threshold signals for that band processing transfers to block component operation 250 and otherwise to copy component operation 260. In copy component operation 260, the input component is copied to a location in a temporary buffer that is identified by the value of band counter B. Copy component operation 260 transfers to increment band operation 270.

In block component operation 250, the associated predetermined signal MAP_i for the band identified by band counter B is copied to the location in the temporary buffer that is identified by the value of band counter B. Block component operation 250 also transfers to increment band operation 270.

In increment band operation 270, band counter B is incremented. Operation 270 transfers to last band check operation 280.

In last band check operation 280, the value of band counter B is compared with the total number of bands for the data elements in the input image. If the value of band counter B is less than the total number of bands, some of the bands for the current data element have not been processed. Consequently, band check operation 280 transfers to process band check operation 220 and operations 220 to 270 are repeated, as appropriate for the next band of the current data element. Thus, the component of each band for each data element is processed sequentially.

When all the band components for the current element have been processed, check operation 280 transfers to generate data element output operation 290. In generate data element output operation 290, the block-stop filtered data in the temporary buffer is set equal to output element pointer Oe. Processing transfers from generate output operation 290 to store operation 140, that was described above.

Therefore, for a multi-banded image stored in band interleave format, a conventional processing system processes the components for each band in sequence. This sequential processing limits the applicability of block-stop filters to data that is not particularly large, because for large images, for example, the sequential processing is too slow in many applications.

As mentioned above for a band sequential image, each band of data is processed in its entirety before the next band is processed. This case is similar to process 100 where process 100 simply process the data point by point, e.g., the number of bands is set to one, and each band can treated as a row of an image with a height equal to the number of bands. Alternatively, each band can be processed as a separate single-banded image of the same dimensions as the original multi-banded image.

Furthermore, if the input data stream is not arranged in a two dimensional format but rather in a linear format, only one loop to span the data and one loop to span the bands would be required. Similarly, process 100 can be extended to N-dimensional data.

The problem with the conventional block-stop filter process is that each band component of each element of the data stream is processed independently and sequentially. This leads to an excessive number of compare and store operations which results in lengthy and inefficient processing of a data stream. For example, a 800×600×24 (800 pixels per row, 600 rows, and 24 bits of color data arranged in 3 bands, red, green and blue) requires processing of 1,440,000 components for each screen display. If the screen display is changing, the 1,440,000 components must be processed each time the screen display changes.

Hence there is a need for a method or system of block-stop filtering which can process a data stream more rapidly and more efficiently than conventional systems.

SUMMARY

In accordance with this invention, a data stream is processed by a block-stop filter in which multiple data bands or multiple data elements are processed simultaneously. Instead of comparing each band component of each data element with its associated low threshold values and associated high threshold value, the block-stop filter obtains faster performance by simultaneously comparing a plurality of data band components with their associated low thresholds and then simultaneously comparing the plurality of data band components with their associated high thresholds. The method also obtains faster performance by simultaneously storing the filtered data in the output data stream.

Specifically, the block-stop filter receives data band components of data elements of the input data stream and forms an input array with the band components. The block-stop filter then simultaneously compares each data band component in the input array with the associated low threshold for the band of which the particular band component is a member. Then, the block-stop filter simultaneously compares each data band component in the input array with the associated high threshold for the band of which the particular band component is a member.

If the data band component of the input array is less than its associated low threshold or greater than its associated high threshold then a corresponding data band component of an output array is set equal to the input data band component. If the data band component is greater than or equal to its associated low threshold and the data band component is less than or equal to its associated high threshold then the corresponding data band component of the output array is set to a predetermined map value associated with the band of which the particular input data band-component is a member. The band-stop filter then generates an output data stream from the output data array.

DETAILED DESCRIPTION

According to the principles of this invention, the limitations imposed by the sequential processing of a block-stop filter have been overcome. The present invention simultaneously processes multiple components or bands of data, or alternatively multiple data elements. For example, one embodiment of the present invention block-stop filters three colors, i.e., a component from each of three bands, for each pixel simultaneously and so reduces the time required by about a factor of three over the prior art block-stop filter.

Furthermore, the flexibility of the invention allows processing components of bands from multiple pixels simultaneously. For example, another embodiment processes six components simultaneously. Consequently, for three-color pixel data, this embodiment processes two pixels simultaneously.

If the number of components processed, using the principles of this invention, is not an integer multiple of the number of bands within the data elements, the invention still provides a performance advantage over the prior art. For example, if the invention is implemented so that four components are processed in parallel, a three color pixel data stream is processed such that four pixels are processed in three cycles.

In a first cycle, the red, green, and blue components of the first pixel with the red component of the second pixel are filtered. In a second cycle, the green and blue components of the second pixel are filtered with the red and green components of the third pixel. In a third cycle, the blue component of the third pixel is filtered with the red, green, and blue components of the fourth pixel. In this embodiment, each data element includes a component in each of N bands and each band is block-stop filtered independently, i.e., each band has an associated low threshold signal TLOW__i, an associated high threshold signal THIGH__i, and associated predetermined signal level MAP__i that is output for components of the band within the range of the two threshold signals for band i.

Figure 3:
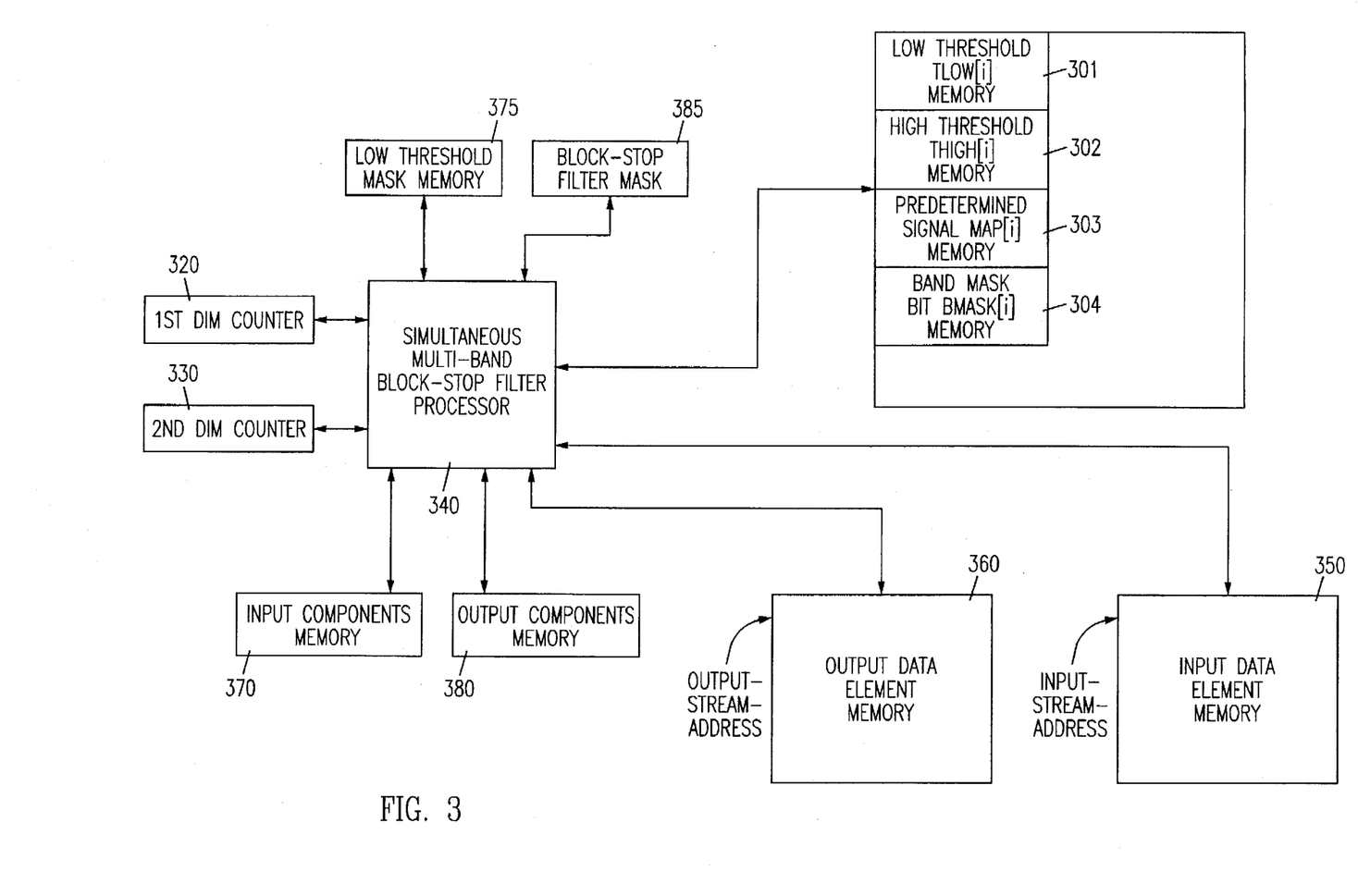
FIG. 3 shows one embodiment of block-stop filtering system in accordance with the present application.

Hence, in this embodiment of the invention, a set of associated low threshold signals TLOW[i], a set of associated high threshold signals THIGH[i], and a set of associated predetermined signal levels MAP[i] are each stored in a memory 301, 302, and 303, respectively. Herein, a reference numeral that includes squarebracket is used to denote a set, sometimes called an array, and an individual member of the set is denoted by the reference numeral, an underline, and then a lower case letter.

In addition, the novel process of this invention includes provision for designating whether the components of a band are passed to the output data stream. Specifically, in this embodiment, a band mask bit BMASK__i is defined for each of the N bands. When band mask bit BMASK__i has a first predetermined value, e.g., a logic one, the components of band i are block-stop filtered and passed to the output data stream. When band mask bit BMASK__i has a second predetermined value, e.g., a logic zero, the components of band i are not passed to the output data stream. The set of band mask bits BMASK[i] are stored in memory 304. Thus, each bit in the set of band mask bits BMASK[i] can be used to prevent passing of a particular band to the output data stream.

Figure 4A:
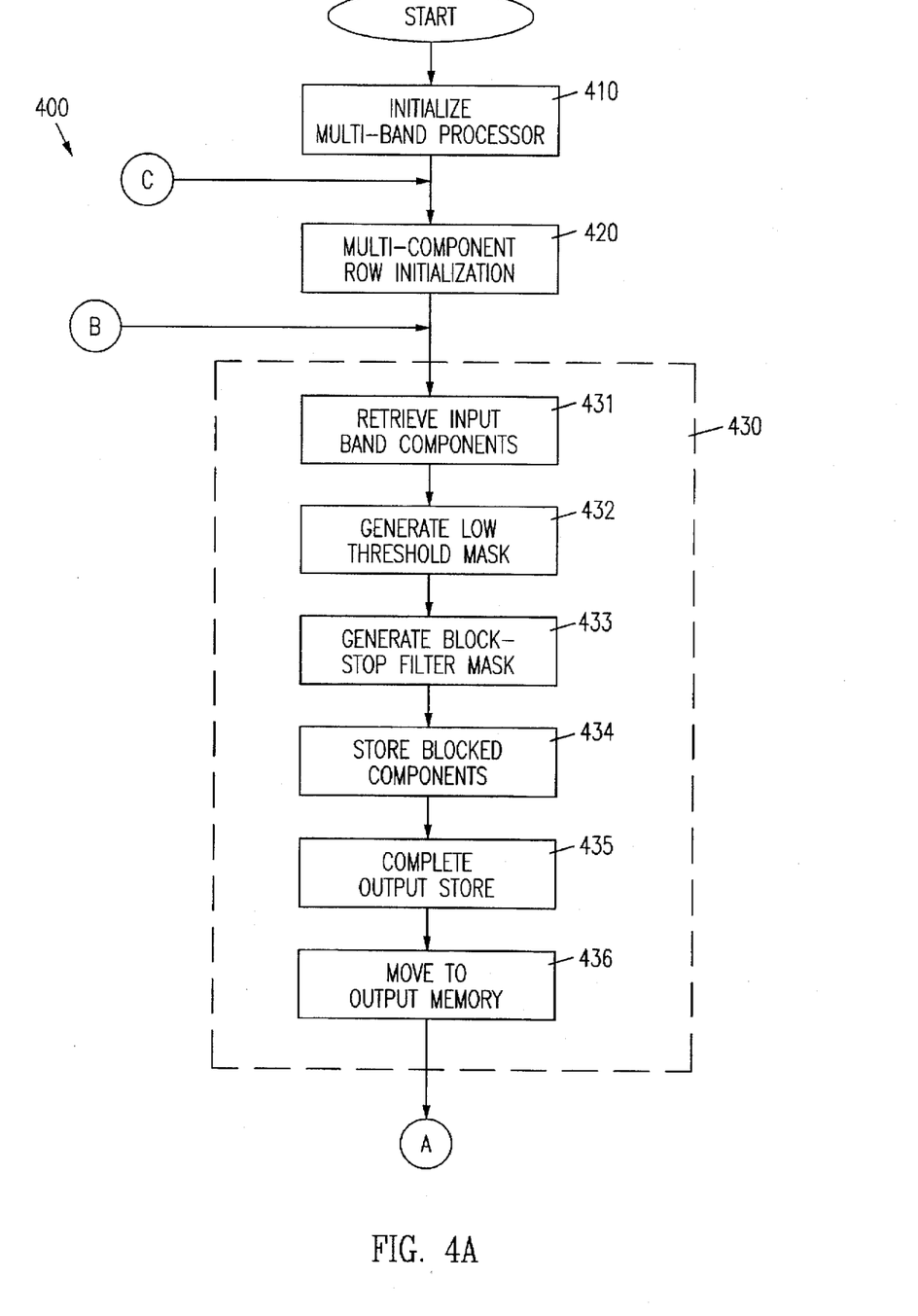
FIGS. 4A and 4B are process flow diagrams for one embodiment of the novel block-stop filter process of this invention.

FIG. 4A is a process flow diagram for the novel block-stop filter process 400 of this invention that filters a two-dimensional input stream of data elements where each data element includes a component in each of N bands. In process 400, simultaneous multi-band block-stop filter processor 340 passes through start operation 401 to initialize multi-band operations 410. In this embodiment, simultaneous multi-band block-stop filter process 340, is a central processing unit that is executing a computer program that implements process 400. As explained more completely below, the central processing unit includes the capability to compare multiple pieces of data simultaneously and to store multiple pieces of data simultaneously. Alternatively, in view of this disclosure, process 400 could be implemented completely in hardware using, for example a state machine or hardware sequencer to control the various operations.

In initialize multi-band operations 410, simultaneous multi-band block-stop filter processor 340 copies a set of associated low threshold signals TLOW[i], a set of associated high threshold signals THIGH[i], a set of associated predetermined signal levels MAP[i], and a set of band mask bits BMASK[i] for the current input data in memory 350 to working memories 301 to 304, respectively. The set of associated low threshold signals TLOW[i], the set of associated high threshold signals THIGH[i], and the set of associated predetermined signal levels MAP[i] can be implemented as a single data word of the central processing unit with each member of the set stored in different bit locations within the word. Alternatively sets or arrays can be implemented as multiple data words. Also, a row input start point is set to address Input__Stream__Address and a row output start point is set to address Output__Stream__Address. As shown in FIG. 3, address Input__Stream__Address is the initial address of memory 350 where the two-dimensional input data elements are stored. Similarly, address Output__Stream__Address is the initial address of output data element memory 360 where the first block-stop filtered data element is to be stored. In some embodiments simultaneous multi-band block-stop filter processor 340 writes the output data stream to the same location as the input data stream, thereby replacing the input data stream with the output data stream. Also, a first dimension counter, e.g., a row counter 320, is initialized, e.g, set to zero in operations 410. Upon completion of initialize multi-band operations 410, simultaneous multi-band block-stop filter processor 340 transfers processing to multi-component row initialization operations 420.

In multi-component row initialization operations 420, simultaneous multi-band block-stop filter processor 340 initializes a second dimension data element counter, e.g., a pixel counter 330, to zero. The value of pixel counter 330 identifies the current pixel in a row for simultaneous multi-band block-stop filter processor 340. A input element pointer MIe is set equal to the row input start point and an output element pointer MOe is set equal to the row output start point. Processing transfers from operations 420 to simultaneous multi-band threshold operations 430

Within simultaneous multi-band threshold operations 430, in retrieve input band components process 431, simultaneous multi-band block-stop filter processor 340 first copies N band components, starting at the location addressed by input element pointer MIe, to an input component array IA in input component array memory 370. Input component array IA is implemented, in one embodiment, as a single data word of the central processing unit with the component for each band stored in different bit locations within the word. For example, the "UltraSPARC" (a registered U.S. trademark of Sun Microsystems Inc.) microprocessor provides a graphic data format for its 64 bit word so that each data word can contain four 16 bit band components. Similar data formats can be found in other microprocessors as well. Alternatively input component array Ia is multiple data words which can be processed simultaneously by the central processing unit. Operation 431 transfers processing to generate low threshold mask operation 432.

In generate low threshold mask operation 432, simultaneous multi-band block-stop filter processor 340 simultaneously compares each component Ia__i in input component array for the N bands with the associated low threshold signal TLOW__i in low threshold signal array TLOW[i] in memory 301. If component Ia__i is less than the associated low threshold signal TLOW__i, simultaneous multi-band block-stop filter processor 340 clears the ith bit in an N-bit low threshold mask memory 375. Conversely, if component Ia__i is greater than or equal to the associated low threshold signal TLOW__i, simultaneous multi-band block-stop filter processor 340 sets the ith bit in low threshold mask memory 375. Alternatively, low threshold mask memory could be initialized to a predetermined state, e.g., cleared, and only the appropriate bits are set.

In either embodiment, upon completion of the comparison, low threshold mask memory 375 contains the results of the low threshold signal comparison for each of the N band components. Preferably, the low threshold comparison is implemented on a hardware level to increase the speed of process 400. For example, the "UltraSPARC" microprocessor available from the assignee of this invention provides an instruction FCMPLE16 which can be used in conjunction with the graphics data format of the microprocessor to perform the desired comparison. The FCMPLE16 instruction allows the "UltraSPARC" to perform the simultaneous comparison within only one of its execution units. Other processors with similar functions are also available. Generate low threshold mask operations 432 transfers processing to generate block-stop filter mask operations 433.

In generate block-stop filter mask operation 433, simultaneous multi-band block-stop filter processor 340 simultaneously compares each component Ia_i in input component array for the N bands with the associated high threshold signal THIGH_i in high threshold signal array THIGH[i] in memory 301. If component Ia_i is greater than the associated high threshold signal THIGH_i, simultaneous multi-band block-stop filter processor 340 generates a logic zero signal and otherwise a logic one signal.

Next, simultaneous multi-band block-stop filter processor 340 performs a bitwise logic AND operation between the logic signals from the high threshold signal comparison and the bits in low threshold mask memory 375. The bitwise result of the logic AND operation is stored in an N-bit block-stop filter mask memory 385. Therefore, the ith bit in N-bit block-stop filter mask memory 385 is set only if the associated low threshold signal TLOW_i is less than or equal to band component Ia_i and band component Ia_i is less than or equal to the associated high threshold signal THIGH i, i.e., if the ith bit is set, the corresponding band component should be blocked. Thus, upon completion of operations 433, band-filter memory 365 contains an array HMASK[i] that indicates which band components are blocked based on the threshold operations. Operations 433 transfers to store blocked components operations 434.

In store blocked components operation 434, each bit HMASK_i in band stop filter mask memory 385 and a corresponding bit BMASK_i in band mask bit memory block 340 are compared with a logic one. e.g, the logic AND of the two bits is formed. If both bits are a logic one, associated predetermined signal MAP_i is copied from memory 303 to the appropriate location in output component memory 380 and otherwise no action is taken in operation 434. Hence, band masking array BMASK[i] provides a way to prevent storing of particular bands of data in the filtered output data. Furthermore, for the embodiment the output data stream replaces the input data streams, only output band components equal to the mapping array need to be written to memory since the output data stream already has the values of the input data stream that are unchanged.

For efficiency, all band components which are processed should be stored at the same time. One way to accomplish this is to use the "UltraSPARC" graphic format and use the ASI_PST$_{16}$_P instruction to perform the partial store based on the band mask and the block-stop filter mask. Upon completion of operations 434, processing transfers to complete output store operations 435.

In complete output store operations 435, each bit HMASK_i in band stop filter mask memory 385 is compared with a logic zero, and a corresponding bit BMASK_i in band mask bit memory block 340 is compared with a logic one. If both comparisons are true, input component Ia_i is copied from memory 370 to the appropriate location in output component memory 380. Preferably, the operations described above in operations 434 are used to perform this partial store in output component memory 380.

Figure 4B:
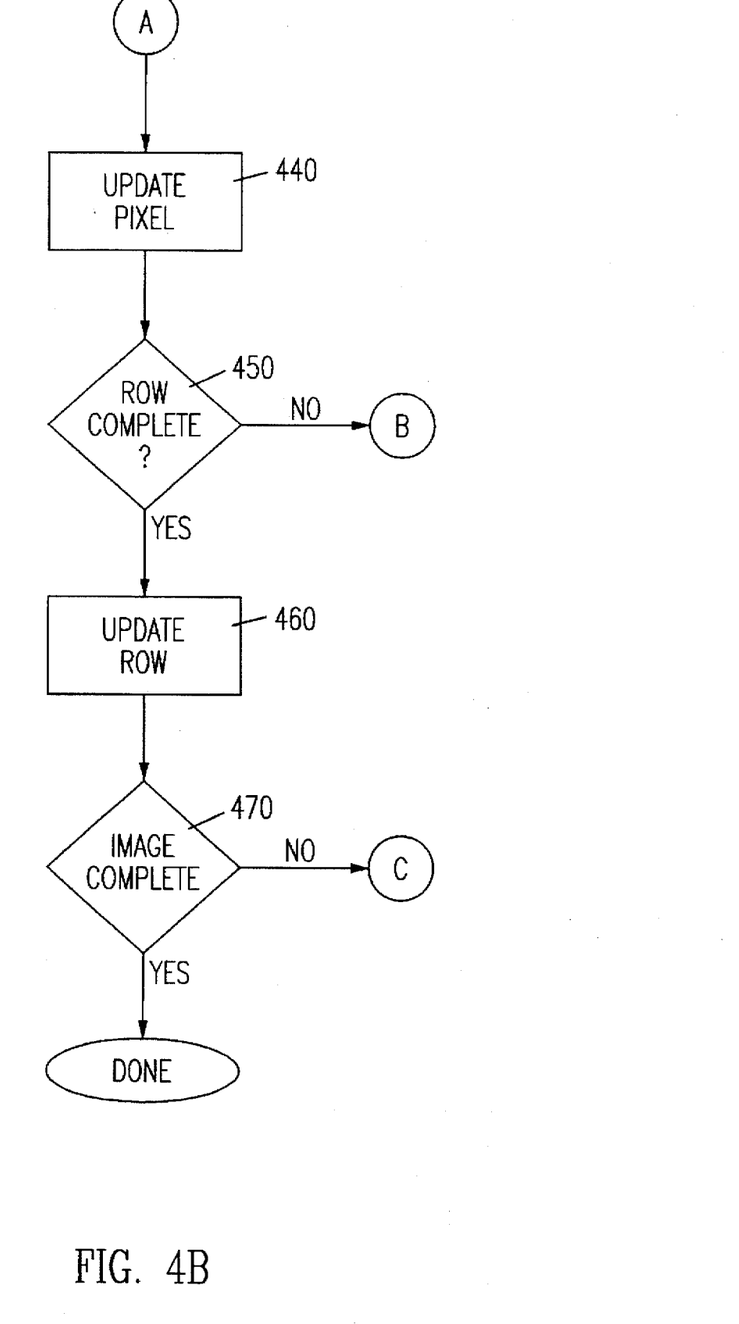

Upon completion of complete output store operations 435, the block-stop filtered components in output component memory are stored in pointer MOe and then stored at the location pointed to by pointer MOe in output data element memory 360 by simultaneous multi-band block-stop filter processor 340. This completes the operations in simultaneous multi-band threshold operations 430 for the current pixel, and so processing transfers to update pixel operations 440 (FIG. 4B).

In update pixel operations 440, the various pointers and pixel counter 330 are updated. Specifically, pixel counter 330 is incremented by one. Input element pointer Ie and output element pointer Oe are incremented by pixel storage length pixel_length so that the pointers identify the storage location of the next pixel to be processed from memory 350, and the storage location of the next output pixel in memory 360.

Row complete check operation 450 determines if the end of a row has been reached. If the current value of pixel counter 330 is greater than or equal to the number of pixels in a row, i.e., greater than or equal to the width of the image, processing of the row is complete. Consequently, if the value of pixel counter 330 is less than the width of the image, processing transfers to operation 430.

Operations 430, and 440 are repeated and processing returns to row complete check operation 450. If the value of pixel counter 330 is less than the width of the image, processing again transfers to operations 430. However, when the value of pixel counter 330 is equal to or greater than the width of the image, processing of the current row of the image is complete and processing transfers to update row operations 460.

In update row operations 460, process 400 is updated to process the next row of pixels in the image. In update row operations 460, row counter 320 is incremented by one, and the row input start point and the row output start point are updated to point to the address of the location for the next row. Specifically, the row input start point and the row output start point are both incremented by the length of a row. Update row operation 460 transfers to image complete check operation 470.

Image complete check operation 470 determines whether all the rows in the image have been processed. If the value of row counter 320 is greater than or equal to the number of rows in the image, operation 470 transfers to done and otherwise to operations 420.

If processing transfers to initialize multi-component row operations 420, operations 430 to 470 are repeated for the next row of the image in the same manner as described above. When operations transfer to done, the complete image has been filtered and the input image has been converted to an output image with components of the image filtered by process 400.

Several alternative embodiments of process 400 are possible based on the simultaneous compare and store capability of simultaneous multi-band block-stop filter processor 340, and the particular type of input data elements. Some of the possible embodiments are described below. These embodiments are illustrative only of the principles of this invention and are not intended to limit the embodiments to the particular operations described.

Figure 5:
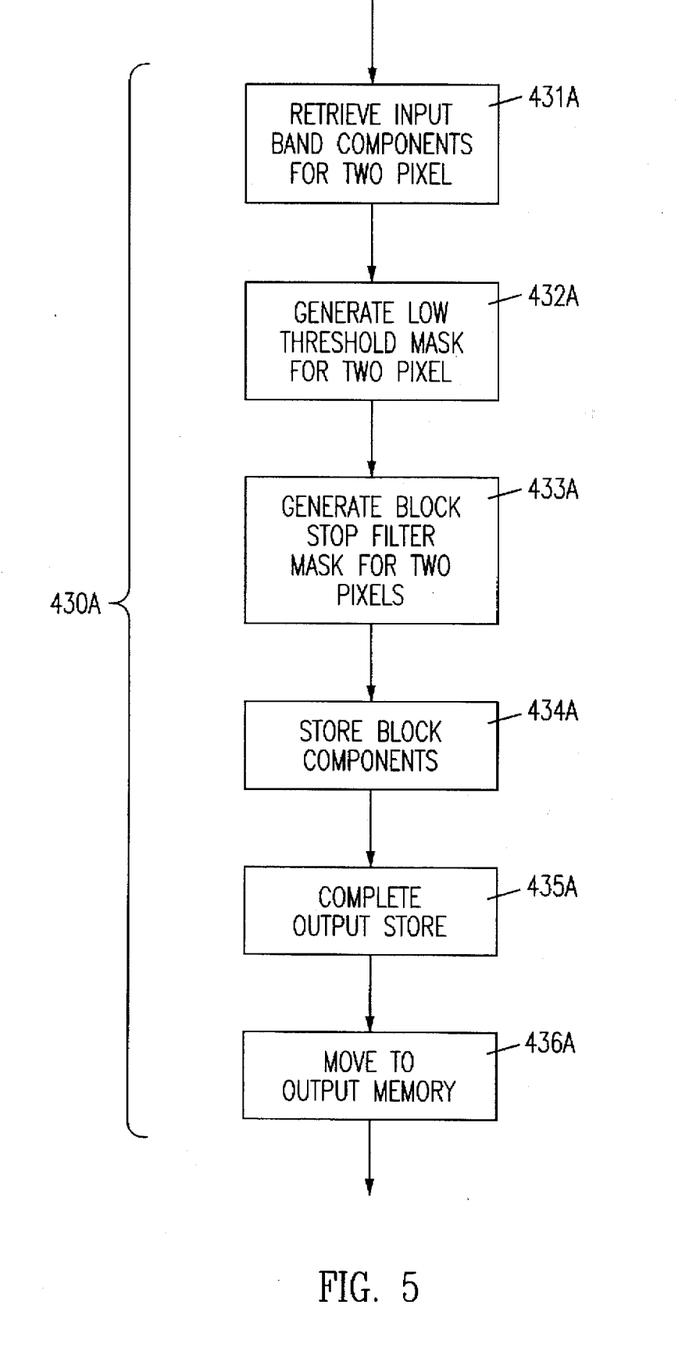
FIG. 5 is an alternative embodiment of which further optimize simultaneous the block-stop filter to reduce the number of memory accesses.

FIG. 5 is an alternative embodiment further optimizing simultaneous multi-band threshold operations 430 to reduce the number of memory accesses by further parallelizing the storing of the block-stop filtered data. In this embodiment, each pixel has components for N bands, but the store capability of simultaneous multi-band block-stop filter processor 340 is 2 N components simultaneously. For example, on a 64 bit processor, a single store instruction can store 8 bytes of data. If the simultaneous compare operation on the 64 bit processor processes four two-byte words and the data band components are of a single byte, simultaneous multi-band threshold operations 430 can be optimized by performing the comparison thresholding on input band components for two data elements before storing the data in a double sized output array.

Within simultaneous multi-band threshold operations 430, in retrieve input band components process 431a, simultaneous multi-band block-stop filter processor 340 first copies N band components, starting at the location addressed by input element pointer MIe, to an input component array IA1 in input component array memory 370. Simultaneous multi-band block-stop filter processor 340 next copies N band components, starting at the location addressed by input element pointer MIe plus pixel storage length pixel_length, to an input component array IA2 in input component array memory 370. Operations 431A transfers processing to generate low threshold mask operation 432A.

In generate low threshold mask operation 432, simultaneous multi-band block-stop filter processor 340 simultaneously compares each component Ia_i in input component array IA1 for the N bands with the associated low threshold signal TLOW_i in low threshold signal array TLOW[i] in memory 301. If component Ia_i is less than the associated low threshold signal TLOW_i, simultaneous multi-band block-stop filter processor 340 clears the ith bit in a low threshold mask memory 375. Conversely, if component Ia_i is greater than or equal to the associated low threshold signal TLOW_i, simultaneous multi-band block-stop filter processor 340 sets the ith bit in low threshold mask memory 375. After the comparison is completed for component array IA1, the data in low threshold mask memory 375 is left shifted by N bits.

Simultaneous multi-band block-stop filter processor 340 next simultaneously compares each component Ia_i in input component array IA2 for the N bands with the associated low threshold signal TLOW_i in low threshold signal array TLOW[i] in memory 301. If component Ia_i is less than the associated low threshold signal TLOW_i, simultaneous multi-band block-stop filter processor 340 clears the ith bit in an 2 N-bit low threshold mask memory 375. Conversely, if component Ia_i is greater than or equal to the associated low threshold signal TLOW_i, simultaneous multi-band block-stop filter processor 340 sets the ith bit in low threshold mask memory 375. Upon completion of the comparisons, low threshold mask memory 375 contains the results of the low threshold signal comparison for each of the N band components for two pixels.

Generate low threshold mask operations 432A transfers processing to generate block-stop filter mask operations 433B. In generate block-stop filter mask operation 433B, simultaneous multi-band block-stop filter processor 340 simultaneously compares each component Ia_i in input component array IA1 for the N bands with the associated high threshold signal THIGH_i in high threshold signal array THIGH[i] in memory 301. If component Ia_i is greater than the associated high threshold signal THIGH_i, simultaneous multi-band block-stop filter processor 340 generates a logic zero signal and otherwise a logic one signal.

In addition, simultaneous multi-band block-stop filter processor 340 simultaneously compares each component Ia_i in input component array IA2 for the N bands with the associated high threshold signal THIGH_i in high threshold signal array THIGH[i] in memory 301. If component Ia_i is greater than the associated high threshold signal THIGH_i, simultaneous multi-band block-stop filter processor 340 again generates a logic zero signal and otherwise a logic one signal.

Next, simultaneous multi-band block-stop filter processor 340 performs a bitwise logic AND operation between the logic signals from the high threshold signal comparison, after appropriate left shifting of the first high threshold signal comparison, and the bits in low threshold mask memory 375. The bitwise result of the logic AND operation is stored in an N-bit block-stop filter mask memory 385. Therefore, the ith bit in N-bit block-stop filter mask memory 385 is set only if associated low threshold signal TLOW_i is less than or equal to band component Ia i and band component Ia_i is less than or equal to associated high threshold signal THIGH_i, i.e., if the ith bit is set, the corresponding band component should be blocked. Thus, upon completion of operations 433A band-filter memory 365 contains an array HMASK[i] that indicates which band components are blocked based on the threshold operations for both input component arrays IA1 and IA2. Operations 433A transfers to store blocked components operations 434A.

In store blocked components operation 434A, each bit HMASK_i in band stop filter mask memory 385 and a corresponding bit BMASK_i in band mask bit memory block 340 are compared with a logic one. e.g, the logic AND of the two bits is formed. If both bits are a logic one, associated predetermined signal MAP_i is copied from memory 303 to the appropriate location in output component memory 380 and otherwise no action is taken in operation 434A.

Operations 434A, 435A, and 436A are similar to those described previously, but when copying components from input component array IA1 to the output component memory or when substituting an associated predetermined signal for a component in input component array IA1, the components must be left-shifted appropriately. Also, since two pixels are being processed, the pixel counter and pointers must be correspondingly updated.

In another embodiment of this invention, both the comparison and store capability of simultaneous multi-band block-stop filter processor 340 are integer multiples of the number of bands N in the input data stream. Specifically, simultaneous multi-band block-stop filter processor 340 compares m*N components simultaneously. Thus, simultaneous multi-band block-stop filter processor 340 can processes m data elements simultaneously. This embodiment is similar to that illustrated in FIGS. 3, 4A and 4B. Consequently, the complete description is not repeated. Rather, only the modifications to the structures and operations in FIGS. 3, 4A, and 4B are described.

In this embodiment, a set of associated low threshold signals TLOW[i], a set of associated high threshold signals THIGH[i], and a set of associated predetermined signal levels MAP[i] are each stored m times in a memory 301, 302, and 303, respectively. Similarly, the set of band mask bits BMASK[i] are stored m times in memory 304.

For example, if simultaneous multi-band block-stop filter processor 340 performs four simultaneous compares and the input data stream is a stereo audio data stream having a left band, L, and a right band R, the number of bands N is two and the number of data elements m that can be simultaneously processed is also two. In this embodiment, left band L has an associated low threshold signal Ll, an associated high threshold signal Lh, and an associated predetermined mapped signal Lm. Similarly, right band R has associated signals Rl, Rh, and Rm. In this case, arrays TLOW[i], THIGH[i], and MAP[i] in memories 301 to 303, respectively, are:

TLOW[i]=Ll, Rl, Ll, Rl;

THIGH[i]=Lh, Rh, Lh, Rh; and

MAP[i]=Lm, Rm, Lm, Rm.

In this embodiment, input component memory initially contains four components L1, R1, L2, R2.

In general, retrieve input band components operation 431, in this embodiment, retrieves N band components for m data elements. The other operations are similar to those previously described with the modified threshold, map and band arrays are used. The pixel counter is increment by m each time and the various pointers are adjusted by m times the pixel storage length.

In the previous embodiments, the number of band components for a data element was either equal to the simultaneous compare capability of simultaneous multi-band block-stop filter processor 340, or the integer the compare capability was an integer multiple of the number of band components. However, as pointed out above, the block-stop filter process of this invention is also advantageous when the number of band components of a data element is less than the simultaneous compare capability of simultaneous multi-band block-stop filter processor 340, but the number of components that can be compared simultaneously is not an integer multiple of the number of band components for a data element.

This is quite common in digital image processing of true color images which use a red band, a green band, and a blue band, i.e, three band components per data element. However, simultaneous multi-band block-stop filter processor 340 simultaneously compares four band components. For this relationship, the block-stop filter can process four data elements in three cycles. To facilitate processing, the set of associated low threshold signals TLOW[i], the set of associated high threshold signals THIGH[i], the set of associated predetermined signal levels MAP[i], and the set of band mask bits BMASK[i] are each stored in a particular configuration in memories 301, 302, 303, and 304, respectively.

Figure 6:
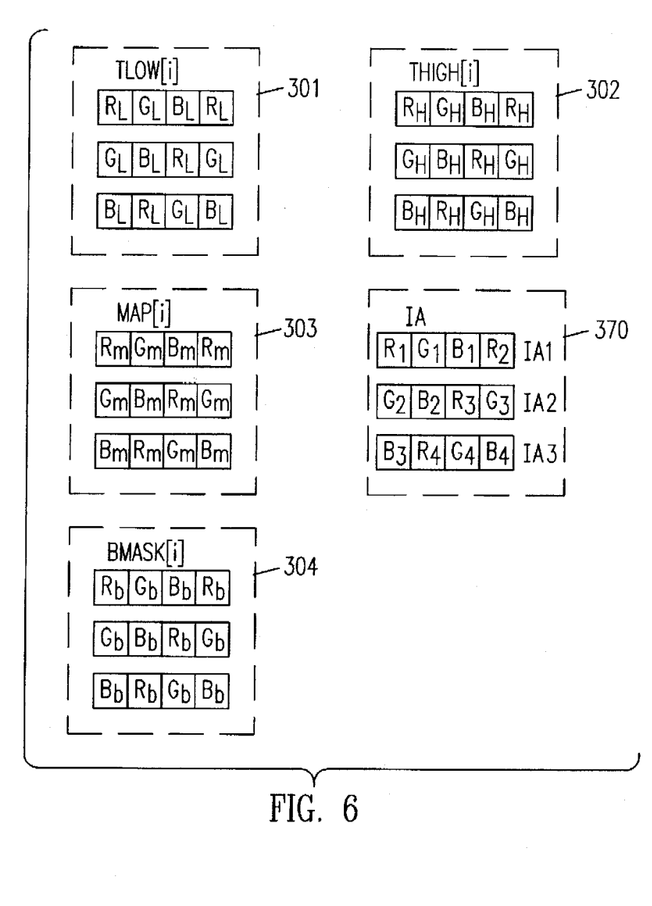
FIG. 6 shows array formats to be used in one embodiment of the threshold function.

Specifically, as shown in FIG. 6, the set of associated low threshold signals TLOW[i], the set of associated high threshold signals THIGH[i], the set of associated predetermined signal levels MAP[i], input component array IA, and the set of band mask bits BMASK[i] are each expanded to three arrays. In FIG. 6, signal RL represents the low threshold signal associated with the red band; signal RH represents the high threshold signal associated with the red band; signal Rb refers to the masking bit for the red band; and signal RM represents the predetermined map signal associated the red band. A similar set of reference numerals is used for the green band threshold and map signals, and for the blue band threshold and map signals. Furthermore, signals R1, R2, and R3 represents the signals for the red band in the first, second, and third data elements, respectively.

Figure 7:
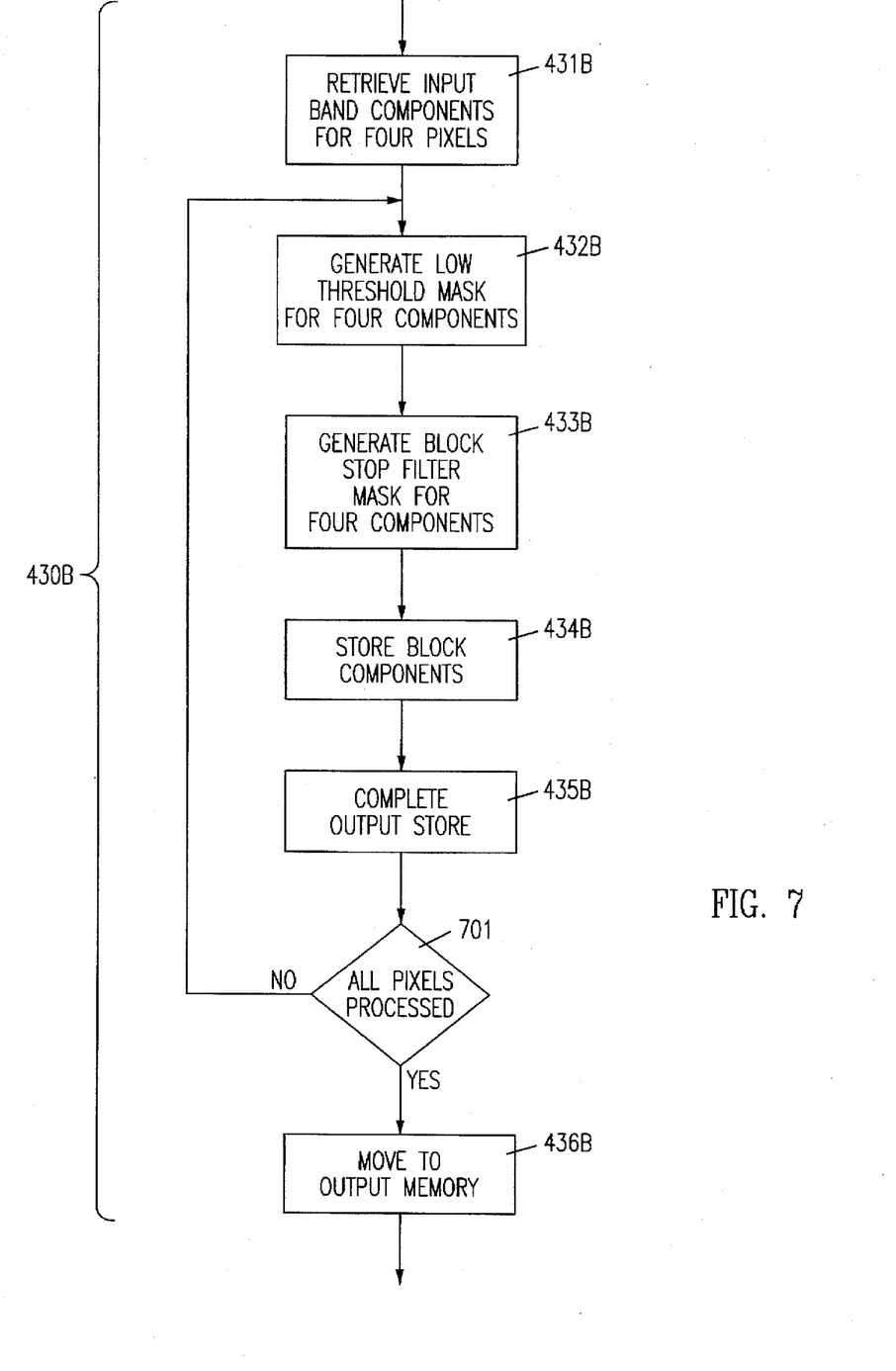
FIG. 7 is an alternative embodiment of the block-stop filter which processes multiple data elements.

With these definitions, simultaneous multi-band threshold operations 430 can be implemented as shown in FIG. 7 as simultaneous multi-band threshold operations 430B. In retrieve input band components process 431B, simultaneous multi-band block-stop filter processor 340 first copies N band components where N is four, starting at the location addressed by input element pointer MIe, to an input component array IA1 in input component array memory 370. Simultaneous multi-band block-stop filter processor 340 next copies the next N band components, starting at the location addressed by input element pointer MIe plus four band components to an input component array IA2 in input component array memory 370. Similarly, N bands are placed in input component memory array IA3 in the same manner.

Operations 431B transfers processing to generate low threshold mask operation 432B. In generate low threshold mask operation 432B, simultaneous multi-band block-stop filter processor 340 simultaneously compares each component Ia_i in input component array IA1 for the N bands with the associated low threshold signal TLOW_i in low threshold signal array TLOW[i] in memory 301. If component Ia_i is less than the associated low threshold signal TLOW_i, simultaneous multi-band block-stop filter processor 340 clears the ith bit in a low threshold mask memory 375. Conversely, if component Ia i is greater than or equal to the associated low threshold signal TLOW_i, simultaneous multi-band block-stop filter processor 340 sets the ith bit in low threshold mask memory 375.

Generate low threshold mask operations 432B transfers processing to generate block-stop filter mask operations 433B. In generate block-stop filter mask operation 433B, simultaneous multi-band block-stop filter processor 340 simultaneously compares each component Ia_i in input component array IA1 for the N bands with the associated high threshold signal THIGH_i in high threshold signal array THIGH[i] in memory 301. If component Ia_i is greater than the associated high threshold signal THIGH_i, simultaneous multi-band block-stop filter processor 340 generates a logic zero signal and otherwise a logic one signal.

Next, simultaneous multi-band block-stop filter processor 340 performs a bitwise logic AND operation between the logic signals from the high threshold signal comparison and the bits in low threshold mask memory 375. The bitwise result of the logic AND operation is stored in an N-bit block-stop filter mask memory 385. Therefore, the ith bit in N-bit block-stop filter mask memory 385 is set only if associated low threshold signal TLOW_i is less than or equal to band component Ia_i and band component Ia_i is less than or equal to associated high threshold signal THIGH_i, i.e., if the ith bit is set, the corresponding band component should be blocked. Thus, upon completion of operations 433B block-stop filter memory 385 contains an array HMASK[i] that indicates which band components are blocked based on the threshold operations for both input component array IA1 and IA2. Operations 433B transfers to store blocked components operations 434B.

In store blocked components operation 434B, each bit HMASK_i in band stop filter mask memory 385 and a corresponding bit BMASK_i in band mask bit memory block 340 are compared with a logic one. e.g, the logic AND of the two bits is formed. If both bits are a logic one, associated predetermined signal MAP_i is copied from memory 303 to the appropriate location in output component memory 380 and otherwise no action is taken in operation 434B.

Operations 434B, 435B are similar to those described previously. Operations 701 determines whether all three input array components have been processed. If an input array component remains to be processed, the operations in simultaneous multi-band threshold operations 430B are repeated for the next input array components. Alternatively, IA1, IA2, IA3 can be processed sequentially without looping or even in parallel.

Figure 8:
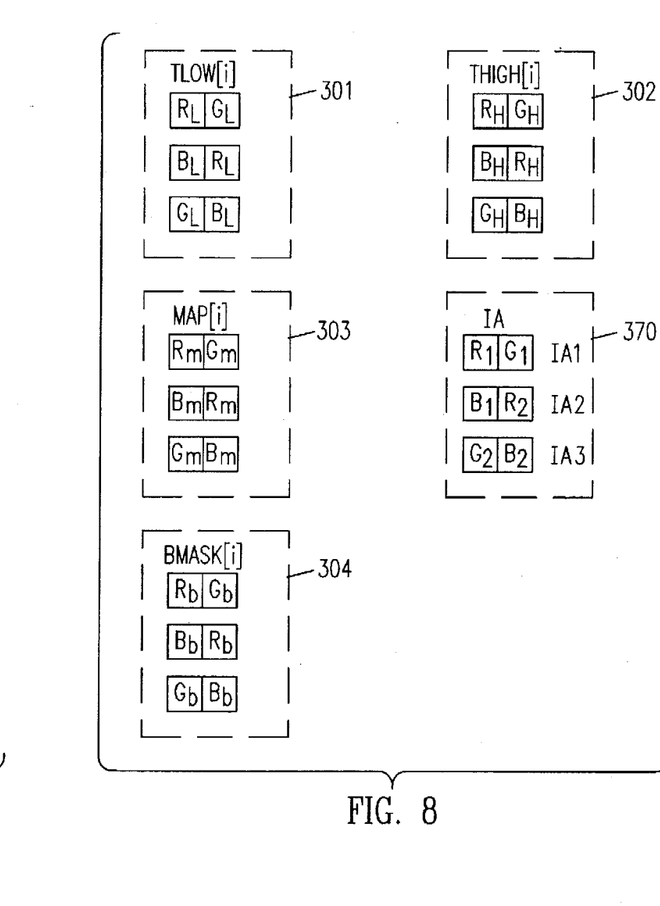
FIG. 8 shows array formats to be used in one embodiment of the threshold function.

Furthermore, the block-stop filter process of this invention is also advantageous when the number of band components of a data element is greater than the simultaneous compare capability of simultaneous multi-band block stop filter processor 340. For example, a simultaneous multi-band block-stop filter processor 340 having the capability to process only two bands simultaneously can be used to process two pixel elements of a three banded true-color image in three cycles. Processing using this embodiment is similar to the embodiment shown in FIGS. 6 and 7 except that in this case, arrays TLOW[i], THIGH[i], and MAP[i] in memories 301 to 303, respectively, are as shown in FIG. 8 and operations 431B, 432B, and 433B use two components instead of four.

One problem that arises from processing multiple data elements simultaneously is that at the edges of the data stream there may not be enough data elements to be simultaneously processed. For example, a simultaneous multi-band block-stop filter processor 340 which is optimized to process four bands simultaneously is used to process a two dimensional single-banded data stream which represents a gray scale image. Since each element has only one band and simultaneous multi-band block-stop filter processor 340 processes four bands, the threshold operation 430 would require four data elements for proper processing. Assume that each row of the image has a width of 6 bytes and is padded by two bytes of some independent significance. On the first pass in each row, bytes 0–3 of the row are given to the threshold operation and proper values are returned. However on the second pass bytes 4–7, which include the non-image but significant bytes padded at the end of each row, are given to the threshold function. These bytes, which should remain unchanged in the output image, will likely be modified by the threshold operation. This problem can occur in any embodiment of the invention in which the simultaneous multi-band threshold operation requires data components from multiple data elements.

One way to alleviate this problem is to use an edge mask EDGE[i]. EDGE[i] would be used within the store blocked components operations 434 which is modified to use EDGE [i] in the same manner as BMASK[i] is used. Therefore, if the EDGE[i] has the bit value 1100, the would not modify the non-image bytes. The edge mask can be generated by comparing the address of the right edge of the image with the starting location of the input component array IA. In this example, on the second pass IA starts at byte 4 and extends to byte 7, the edge of the image is at byte 5. Therefore, bytes 4 and 5 should be processed, while 6 and 7 should not be processed. Therefore, the edge mask should have a value of 1100. Preferably, the generation of the edge mask can be accomplished with specialized hardware. For example, the "UltraSPARC" microprocessor provides the edge handling instructions such as edge8, edge16, and edge32 which can be used to create the edge mask for various data element size.

The various embodiments of the invention can be implemented by one skilled in the art using the "UltraSPARC" microprocessor and the Visual Instruction Set (VIS), which are described in detail in U.S. patent application Ser. No. 08/236572, filed Apr. 29, 1994, now pending entitled "A CENTRAL PROCESSING UNIT WITH INTEGRATED GRAPHICS FUNCTION", by Van Hook et al., which is incorporated herein by reference in its entirety. To compile code using the VIS instruction set, SPARC Compiler 4.0, or later, (available from Sun Microsystems) is required. Although other compilers using the VIS instruction set may also be available. Furthermore, Sun Microsystems provides a VIS Developer's Kit, which contains various header files, libraries, examples, etc. which can be used to more easily implement the present invention.

If the invention is implemented using software for a computer system, the software implementation should be stored on a computer useable medium to be produced as a computer program product. Various types of computer useable media include magnetic disks, optical disks, tapes, solid state memories (e.g. Flash ROMS), magnetic tapes, etc. The computer program product on a computer useable medium contains computer readable code for block-stop filtering a data stream. Specifically, the computer program product includes a plurality of computer readable code devices configured to: receive an input data stream having a plurality of data elements, wherein each of the data elements includes at least one data band component; form an input array of a predetermined size having a plurality of data band components; and create an output data array of data band components of the predetermined size. The computer readable code devices would create the output array by simultaneously comparing each data band component of the input array with an associated low threshold of the data band component and by simultaneously comparing each data band components of the input array with an associated high threshold of each data band component. If the data band component of the input array is less than the associated low threshold or if the data band component of the input array is greater than the associated high threshold the computer readable code devices cause a corresponding data band component of the output array to be equal to the data band component of the input array. If the data band component of the input array is greater than or equal to the associated low threshold and the corresponding data band component of the input array is less than or equal to the associated high threshold setting, the computer readable code devices cause a corresponding data band component of the output array to be set equal to an associated mapping value. The computer readable code devices are also configured to generate an output data stream from the output data array.

The various embodiments of the structure and method of this invention that are described above are illustrative only of the principles of this invention and are not intended to limit the scope of the invention to the particular embodiments described. In view of this disclosure, those skilled-in-the-art can define other simultaneously compare operations, other data structures, other edge conditions, other hardware implementations, and use these alternative features to create a method or system according to the principles of this invention.

We claim:

1. A method of block-stop filtering a data stream in a computer system having a memory and a processor comprising:

receiving an input data stream having a plurality of data elements, wherein each of said data elements includes at least one data band component;

forming an input array of a predetermined size having a plurality of data band components; creating an output data array of data band components of said predetermined size by simultaneously comparing each data band component of said input array with an associated low threshold of said data band component;

simultaneously comparing each data band component of said input array with an associated high threshold of each data band component;

if said data band component of said input array is less than said associated low threshold or if said data band component of said input array is greater than said associated high threshold:

setting a corresponding data band component of said output array to be equal to said data band component of said input array;

if said data band component of said input array is greater than or equal to said associated low threshold and said corresponding data band component of said input array is less than or equal to said associated high threshold setting a corresponding data band component of said output array to be equal to an associated mapping value; and generating an output data stream from said output data array.

2. The method of claim 1, wherein said input data stream is a two-dimensional image.

3. The method of claim 2, wherein each data element of said two-dimensional image includes a red band component, a green band component, and a blue band component.

4. The method of claim 2, wherein each data element of said two-dimensional image includes an alpha band component, a red band component, a green band component, and a blue band component.

5. The method of claim 4, wherein said input data array is formed from said alpha band component, said red band component, said green band component, and said blue band component of a single data element of said input stream.

6. The method of claim 1, further comprising forming a low threshold array with said associated low thresholds;

forming a high threshold array with said associated high thresholds; and forming a mapping array with said associated mapping values.

7. The method of claim 6, wherein each of said low threshold array, said high threshold array, said mapping array, said input array, and said output array can be represented by a single data word of said processor.

8. The method of claim 6, wherein a plurality of low threshold arrays, and a plurality of high threshold arrays are used.

9. The method of claim 1, wherein a single execution unit of said processor performs said step of simultaneously comparing of each data band of said input array with said associated low threshold of said data band component.

10. The method of claim 1, wherein said input array includes data band components from a plurality of data elements.

11. The method of claim 1, wherein said input data stream is stored in a first location of said memory and said output data stream is stored in a second location.

12. The method of claim 11, wherein said first location is equal to said second location.

13. The method of claim 12, wherein only data band components equal to said associated mapping array are written to said memory.

14. The method of claim 1, wherein said input array has data band components from a plurality of data elements.

15. The method of claim 1, wherein said data elements have only one data band.

16. The method of claim 1, further comprising:

using a masking array of said predetermined size, wherein said masking array determines which bands of said output array are written to said memory.

17. The method of claim 1, further comprising:

forming an edge mask array of said predetermined size halving a plurality of edge components, wherein said edge components have a first value if corresponding data band components of said input array are part of said input stream to be processed and said edge components have a second value of corresponding data band components of said input array are padding data; and using said edge mask to prevent writing said associated mapping value to said data band component of said output array if said edge component has said second value.

18. A method of block-stop filtering a plurality of data components comprising:

retrieving said data components from a memory;

generating a low mask comprising a plurality of members, wherein each member of said low mask corresponds with one of said retrieved data components by simultaneously comparing each of said data components with an associated member of a predetermined low threshold array; and storing a result of each of said comparisons in a corresponding member of said low mask, wherein each member of said low mask is set to a first value if said corresponding data component is less than said associated member of said low threshold array and each member of said low mask is set to a second value if said corresponding data component is greater than or equal to said associated member of said low threshold array;

generating a block-stop filter mask comprising a plurality of members, where each member of said block-stop filter mask corresponds to one of said members of said low mask and one of said data band components by simultaneously comparing each of said data components with an associated member of a predetermined high threshold array; and storing a result of each of said comparing in a corresponding member of said block-stop, wherein each member of said block-stop mask is set to said first value if said corresponding data component is greater than said associated member of said high threshold array and a corresponding member of said low mask is set to said first value;

said second value if said corresponding data component is less than or equal to said associated member of said high threshold array or said corresponding member of said low mask is set to said second value;

storing said corresponding data components for each member of said block-stop filter which is equal to a first predetermined value; and storing a predetermined map value for each member of said block-stop filter which is equal to a second predetermined value.

19. The method of claim 18, wherein each of said member of said low threshold mask and said block-stop mask is a single bit, said first value is logic one, and said second value is logic zero.

20. A computer program product having a computer useable medium having computer readable code embodied therein for block-stop filtering a data stream, the computer program product comprising:

computer readable code devices configured to receive an input data stream having a plurality of data elements, wherein each of said data elements includes at least one data band component;

computer readable code devices configured to form an input array of a predetermined size having a plurality of data band components;

computer readable code devices configured to create an output data array of data band components of said predetermined size by simultaneously comparing each data band component of said input array with an associated low threshold of said data band component;

simultaneously comparing each data band component of said input array with an associated high threshold of each data band component;

if said data band component of said input array is less than said associated low threshold or if said data band component of said input array is greater than said associated high threshold:

setting a corresponding data band component of said output array to be equal to said data band component of said input array;

if said data band component of said input array is greater than or equal to said associated low threshold and said corresponding data band component of said input array is less than or equal to said associated high threshold setting a corresponding data band component of said output array to be equal to an associated mapping value; and computer readable code devices configured to generate an output data stream from said output data array.

21. The computer program product of claim 20, wherein said input data stream is a two dimensional image having a horizontal axis and a vertical axis.

22. The computer program product of claim 21, wherein said data elements of said input data stream includes a red band component, a green band component, and a blue band component.

23. The computer program product of claim 20, further comprising computer readable code devices configured to form a low threshold array with said associated low thresholds;

computer readable code devices configured to form a high threshold array with said associated high thresholds; and computer readable code devices configured to form a mapping array with said associated mapping values.

24. The computer program product of claim 23, wherein each of said low threshold array, said high threshold array, said mapping array, said input array, and said output array can be represented by a single data word.

25. The computer program product of claim 20, wherein a single execution unit of a processor executes said computer readable code devices configured to create said output data array of data band components.

26. The computer program product of claim 20, wherein said input array has data band components from a plurality of data elements.

27. The computer program product of claim 20, wherein said data elements have only one data band.

* * * * *